March 22, 1949.  L. B. SAMMIS ET AL  2,464,947

METHOD OF PROCESSING OLIVES

Filed Sept. 14, 1945

INVENTORS
Louis B. Sammis
and Ray L. Keck

BY

ATTORNEYS

Patented Mar. 22, 1949

2,464,947

UNITED STATES PATENT OFFICE 2,464,947

METHOD OF PROCESSING OLIVES

Louis B. Sammis and Ray L. Keck, Wallace, Calif.

Application September 14, 1945, Serial No. 616,194

5 Claims. (Cl. 99—156)

This invention relates to a method of processing olives and represents a marked departure from those methods and the apparatus heretofore practiced and used in the olive processing industry.

In order that the novelty and utility of our improved process and apparatus may be better understood, we will first briefly describe the process and apparatus which has heretofore been practiced and used with substantial uniformity by practically the entire olive processing industry and from the very inception of the processing of olives in this country. According to this old and time-honored process the olives are placed in relatively long and wide or relatively large square vats having a depth of from 1½ feet to 2 feet. Each of these vats, of which ever form used, usually contains from ½ ton to 1 ton of loose olives and in a processing plant of average size a very considerable number of such vats must be employed to carry out the process.

After the olives are placed in such a vat they are covered with a solution of sodium hydroxide, the strength of which varies according to the ideas of the different processors, but which averages about 1½% of the sodium hydroxide.

The olives are allowed to stand in this solution until the solution penetrates to a distance of about $\frac{1}{16}$ of an inch into the flesh of the olives. This usually requires from one to two hours and during this period of time it is customary to agitate the olives with paddles or by introducing compressed air into the vats. This agitation must be carried out at least one or two times during the period in which the olives remain in said solution and of course requires the attention of the operator.

When the lye has penetrated into the flesh of the olives to the degree mentioned, the lye is withdrawn from the vat. The olives are then allowed to stand quiescent in the vat for a period of approximately twelve hours. This is for the purpose of allowing the olives to be exposed to the atmosphere to bring the presence of oxygen all about the olives.

After the olives have thus remained quiescent for the period noted, water is added to the vats in a sufficient degree to submerge the olives. The oxidized olives being then intermittently stirred in this water solution in order to move them uniformly through the same and to prevent their lying one against the other while being subjected to the water bath.

It is the theory of the industry that the presence of the lye and natural acids of the flesh of the olives when brought in the presence of oxygen, produces the color substance which causes the olives to develop their rich dark color when processed, and the agitating of the olives in the presence of the water is intended to properly distribute the effect of this coloring uniformly throughout the surface of the olive.

After the olives have been thus subjected to this water solution and thoroughly stirred therein, the water is withdrawn and the olives are again allowed to remain quiescent and exposed to the air and this washing operation is repeated two or three times.

The olives are then again submerged with the sodium hydroxide solution and allowed to stand until the same penetrates about half way to the pits of the olives which usually takes from two to six hours and careful checking must be made in this regard. The olives are then subjected to the air and water treatment, the same as described above and this alternate treatment of the olives is repeated until the lye solution has cut through the flesh of the olives clear to the pits thereof.

This intermittent application of the air treatment and the water treatment of the olives carried to a point of completion of the process usually takes from seven to ten days for each vat of olives employed. After the last lye treatment of the olives, the lye is thoroughly washed out of the olives by repeated applications of the washing water and are then placed for two or three days in a light brine solution to cure at which time they are ready for canning.

It will be obvious that these old method steps just described are slow, laborious and uncertain as to uniformity of treatment of the olives and require a very considerable investment in vats, stirring equipment and the like. Furthermore, they must necessarily involve a very considerable loss of the lye solution which it will be apparent does not occur in our improved method as hereinafter described.

It is the primary object of our invention to so improve upon the above described methods and the apparatus used in connection therewith as to practically reduce by one-half the time required for the treatment of the olives, to reduce the labor expense involved in the handling of the olives, and to produce a much improved and uniform finished product.

This object we accomplish by the use of an improved apparatus which enables us to handle the product in an entirely different sequence of steps, and rapidly and economically.

One form of our improved apparatus is shown in the accompanying drawings in which—

Figure 1:
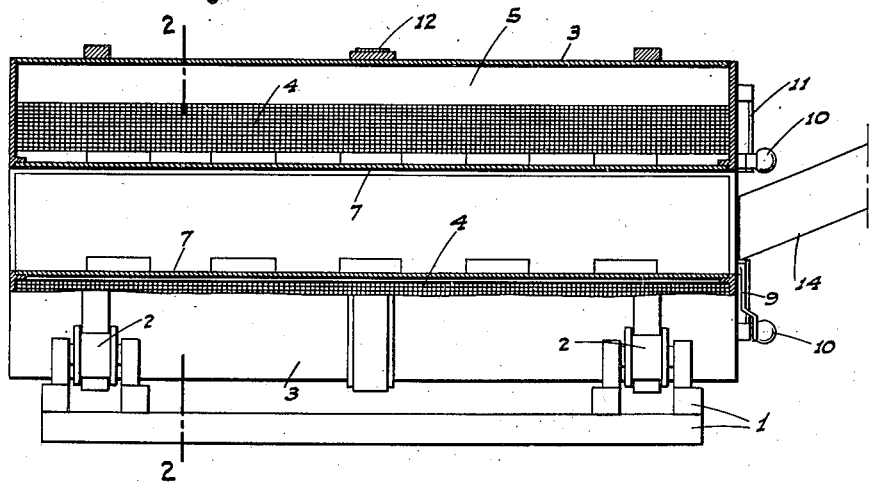
Figure 1 is a side elevation, mostly in section, of our improved processing drum.
Figure 2:
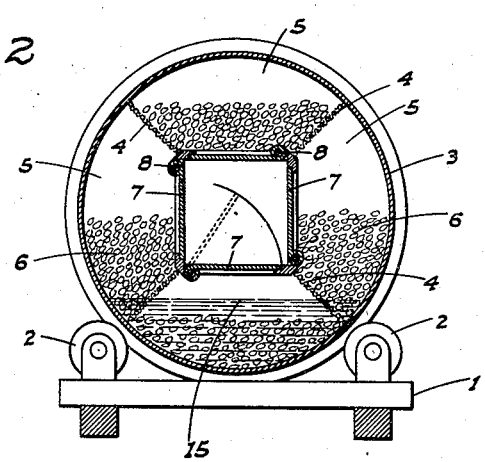
Figure 2 is a cross sectional view of the drum taken on a line 2—2 of Figure 1.
Figure 3:
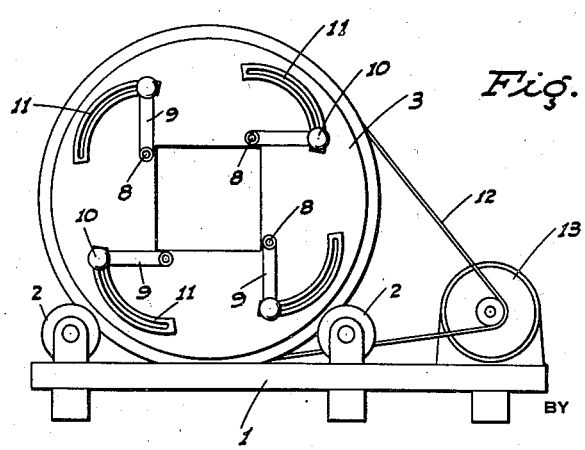
Figure 3 is an end view of the drum showing the door control levers.

Referring now to the characters of reference on the drawings the numeral 1 designates any desirable form of supporting foundation or frame work. Mounted on this support 1 are pairs of spaced-apart rollers 2 in which is mounted for rotation a drum 3 having an impervious outer shell divided by foraminous partitions 4 into a selected number of compartments 5.

Olives 6 may be introduced into each of the compartments 5 through a central door 7 extending centrally through the drum 3 at a point a short distance outwardly from the central axis thereof; there being a door for each compartment. Each door is hinged along one of its edges as at 8 and makes a liquid-tight connection with the compartment 5 at both edges. On each door 7 adjacent its hinged point is fixed a short lever 9 having at its outer end an operating knob 10 adapted for frictional engagement with a slotted guide bar 11. Upon movement of the lever 9 the door may be moved to and held in either opened or closed position.

The drum 3 is adapted to be driven at a very slow speed, preferably about one revolution in twenty minutes, through the medium of any desired geared drive 13 driving a belt or chain 12 mounted about the drum 3 in driving relation thereto.

In practicing our improved method, olives are filled into each compartment 5, by sluicing or otherwise, through the doors 7.

A solution of sodium hydroxide of desired strength is then filled into the lower portion of the drum 3 so as to cover the olives therein to a depth of from one to two inches; all doors 7 are then closed tight.

The drum 3 is then slowly rotated at the above stated speed or at such other speed that proves most effective. Due to the slow speed of the drum the sodium hydroxide solution remains at a fairly constant level in the lower side of the drum while the olives in the several compartments 5 are slowly and intermittenly moved through this solution and then out of the same for exposure to the air. As the drum rotates the olives slowly and uniformly roll about each other to keep them fairly well agitated, and as they move out of the solution into the air and on about the circle of movement, they tumble about so that they have complete and uniform surface exposure to the air and become thoroughly oxidized before the rotation of the drum is discontinued. Such rotation of the drum is first discontinued when the solution has cut into the flesh of the olives to a depth of approximately one-sixteenth of an inch, and in our process this usually takes from three to six hours according to the condition of the olives. In this same period of time the olives have not only been properly penetrated by the solution to that depth, but they have been simultaneously therewith and automatically subjected to the proper oxidation so that at the end of this rotation of the drum they are ready for the water treatment which is necessary to the proper diffusion of the coloring matter.

The sodium hydroxide solution is, therefore, withdrawn and water substituted therefor and the drum is then again slowly rotated in the presence of this water for a period of about twelve hours which thoroughly washes out the lye and diffuses the coloring matter uniformly throughout all the olives.

The water is withdrawn and another solution of sodium hydroxide introduced into the drum and the rotation of the drum repeated with the same result of continuing the penetration of the solution to a further depth into the flesh of the olives. The sodium hydroxide is then withdrawn and the olives again subjected to the water treatment after which a final treatment with the sodium hydroxide is indulged in followed by a final washing of the olives all within the drum.

The process, carried out in our apparatus and according to our method, is usually completed within a period of about three days as against the period of from seven to ten days required under the old process. Furthermore, due to the gentle manipulation and constant agitation of the olives as they move through the sodium hydroxide, and through the air, and through the water, the penetration of the sodium hydroxide is more thorough, and the diffusion of the coloring matter through the olives is much more uniform so that the final product is firmer, more properly colored, and in much more uniform condition as to both, than are olives processed under previous methods.

It will also be apparent that due to the fact that when the olives are once placed in the drum, the handling of the same is entirely and automatically taken care of by the operation of the drum. There is very little labor cost involved in handling the same.

When finally completely processed in the drum, the olives will be withdrawn from the several compartments by any desired method, preferably through the use of a standard olive pump which is available on the market. Just as soon as the olives are withdrawn from the drum, the drum may be put into operation on another batch of olives, which is not true of the vat method where the vats must be used not only for the processing, but also for the holding of the olives in the final brine solution.

Consequently the necessity for investment for holding vats is materially reduced through the use of our process.

While we have shown one preferred form of apparatus for carrying out our improved method, it will be apparent that the specific details of such apparatus may be varied with respect to the type and character of materials used and a specific arrangement of the parts. We do not wish to be understood to restrict ourselves to the exact structural details set out in the drawings, as modifications therefrom may readily be made without departing from the scope of our invention as defined in the appended claims.

Having thus described our invention, what we claim to be new and useful and desire to secure by Letters Patent is:

1. That method of processing olives which consists in moving a mass of olives along a path and while so in motion alternately bringing such olives first into the presence of a treating solution and then into the presence of air, continuously tumbling the olives relative to each other while they are in the presence of the air and continuing such movement of the olives until the predetermined desired effect of the solution and air upon the olives is attained.

2. That method of processing olives which consists in moving a mass of olives along a circular path and while so in motion alternately bringing such olives first into the presence of a treating solution and then into the presence of air, continuously tumbling the olives relative to each other while they are in the presence of the air and continuing such movement of the olives until the predetermined desired effect of the solution and air upon the olives is attained.

3. That method of processing olives which consists in dividing a mass of olives into a number of separated but contiguous batches, establishing a bath of treating solution, moving all the batches along a path while maintained in their contiguous and separated relation, and successively moving each batch first through the solution and then into the air, continuously tumbling the olives relative to each other while they are in the presence of the air and continuing the movement of all the batches along said path until a predetermined desired effect of the solution and air on the olives is attained.

4. That method of processing olives which comprises the placing of olives in a processing solution, then slowly and continuously moving the olives out of the solution and into the air and then back into the solution, continuously tumbling the olives relative to each other while they are in the presence of the air, and continuing such movement of the olives until a predetermined effect of the solution and of the air on the olives is attained.

5. That method of processing olives comprising the steps of moving a batch of loose olives through a circular path, continuously moving the batch through a treating solution for a limited portion of its travel through said circular path, holding the batch clear of the solution and exposed to the air for the entire balance of its travel through said circular path, continuously tumbling the olives of the batch relative to each other during the period of travel out of the solution whereby the olives will be individually exposed to the air during such period of travel, and continuing such steps until a predetermined effect of the solution and of the air on the olives is attained.

LOUIS B. SAMMIS.
RAY L. KECK.

REFERENCES CITED

The following references are of record in the file of this patent:

UNITED STATES PATENTS

| Number | Name | Date |
|---|---|---|
| 1,257,584 | Cruess | Feb. 26, 1918 |
| 1,393,873 | Wolff | Oct. 18, 1921 |
| 1,507,577 | Browne | Sept. 9, 1924 |
| 1,625,494 | Olivarius | Apr. 19, 1927 |
| 1,915,242 | Robeiro | June 20, 1933 |
| 1,923,421 | Chapman | Aug. 22, 1937 |
| 2,070,558 | Beck | Feb. 16, 1937 |
| 2,095,454 | Simonsen | Oct. 12, 1937 |
| 2,356,287 | Dellen | Aug. 22, 1944 |